A. E. ENGSTRÖM.
GARDEN RAKE.
APPLICATION FILED JAN. 25, 1910.

962,559.

Patented June 28, 1910.

Witnesses:
Carl O. Sahlberg
Ellen Erikson.

Inventor:
Axel Emil Engström

UNITED STATES PATENT OFFICE.

AXEL EMIL ENGSTRÖM, OF HUSKVARNA, SWEDEN.

GARDEN-RAKE.

962,559.  Specification of Letters Patent.  Patented June 28, 1910.

Application filed January 25, 1910.  Serial No. 540,038.

*To all whom it may concern:*

Be it known that I, AXEL EMIL ENGSTRÖM, a subject of the King of Sweden, residing at Huskvarna, in the Province of Småland and Kingdom of Sweden, have invented a new and useful Garden-Rake, of which the following is a specification.

In cleaning gardens there has always been difficulty in raking under hedges, around trees and bushes, and like places, where ordinary rakes cannot be used, it being necessary to use the hands for picking up dead leaves, grass, weeds, and the like, which have collected there.

The present invention refers to a rake especially constructed for use under the aforesaid circumstances, and is set forth in the accompanying drawing, in which—

Figure 1:
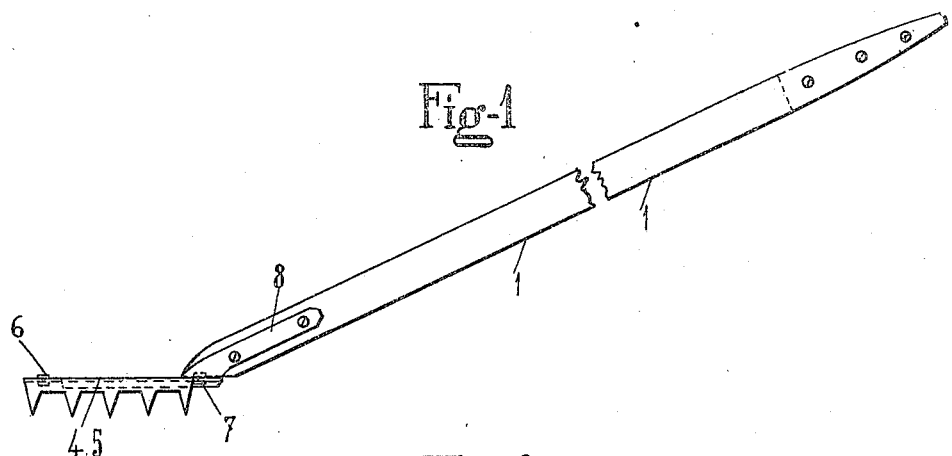
Figure 2:
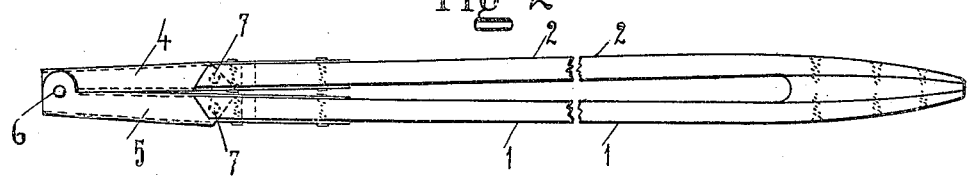
Figure 3:
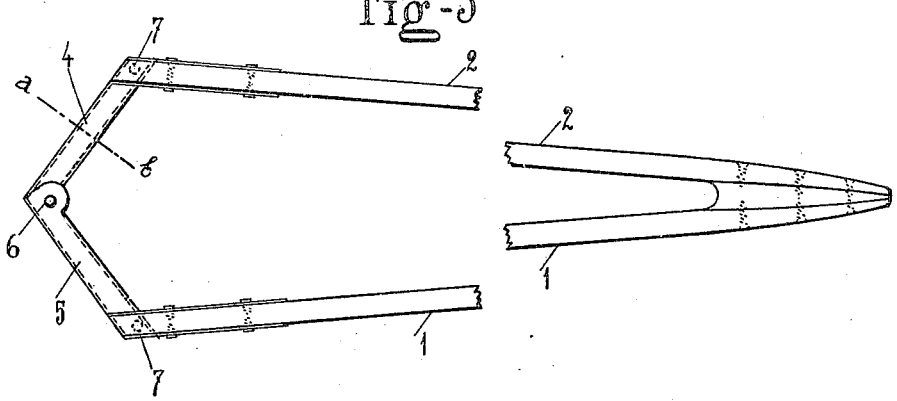
Figure 4:

Figure 1 is a side view and Fig. 2 a plan of the rake, which is closed, or folded up in both figures. Fig. 3 is a plan of the rake in an open position. Fig. 4 is a section of the head of the rake along the line a—b in Fig. 3.

The rake is furnished with two handles, 1, 2, closely united at their top ends and are resilient so that they will spring apart after being pressed toward each other. The head of the rake is hinged to the other ends of the handles 1, 2, and this head is divided into two sections, 4 and 5, which are hinged to each other by the pivot 6 and to the handles by the pivots 7, 7. These pivots 7 pass through holes in the ferrules 8, 8 on the lower ends of the handles. The head 4, 5, is made of iron plate, with cut teeth, which constitute the tines of the rake. The cross section of the head, 4, 5, is made U-shaped, with one of the flanges, the one carrying the teeth or tines, somewhat wider than the other, the flanges being somewhat bent inward, so that they converge downward, as shown in Fig. 4. This inward bend of the inside flange is intended to prevent the cutting of grass, and the like, when the rake is folded together and the weeds are to be pulled up by the roots. The inward bend of the outer flange is intended to prevent the rake from scraping off the bark from trees and bushes near which the rake is used when folded together.

From the foregoing it will be seen that this rake, besides being used as an ordinary rake, can also be used to pull up weeds, and the like, if the rake is placed so that the weeds will come between the two sections 4 and 5 of the rake head when the two handles are pressed toward each other, the weeds then being pinched between the sections 4 and 5 and easily pulled up. When the rake is to be used under hedges or around bushes, or in other close quarters, the handles are pressed more or less together, so that there will be room for the rake handle.

I claim.

In a garden rake, the combination of two handles, connected together at their extremities, and a rake head, consisting of two sections hinged to each other and also each hinged to one of the handles.

AXEL EMIL ENGSTRÖM.

Witnesses:
CARL O. SAHLBERG,
HEDWIG MELINDER.